United States Patent [19]
Patterson et al.

[11] 3,922,433
[45] Nov. 25, 1975

[54] ALUMINOUS METAL WITH GLASS BEADS BONDED TO A METAL SUBSTRATE

[75] Inventors: William C. Patterson, Pittsburgh, Pa.; Charles I. Hill, Menlo Park, Calif.

[73] Assignee: Aluminum Company of America, Pittsburgh, Pa.

[22] Filed: June 8, 1973

[21] Appl. No.: 368,333

Related U.S. Application Data

[63] Continuation-in-part of Ser. No. 119,906, March 1, 1971, abandoned.

[52] U.S. Cl. ............... 428/334; 40/135; 350/105; 427/204; 427/398; 427/427; 427/431; 428/325; 428/432; 428/457
[51] Int. Cl.² ............... B32B 15/02; B32B 17/06
[58] Field of Search ............... 117/9, 16, 29, 33; 29/182.5; 40/134, 135, 125 E, 130 J; 350/126, 105; 427/202, 398, 427, 431; 428/325, 334, 432, 457

[56] References Cited
UNITED STATES PATENTS

| | | | |
|---|---|---|---|
| 1,902,440 | 3/1933 | Gill | 40/130 |
| 2,173,484 | 9/1939 | Lerch et al. | 117/16 |
| 2,277,023 | 3/1942 | Steiner et al | 29/197.5 |
| 2,383,884 | 8/1945 | Palmquist | 40/135 |
| 2,568,126 | 9/1951 | Keeley | 40/135 |
| 3,037,885 | 6/1962 | Abolins | 117/232 |
| 3,052,989 | 9/1962 | Doleman | 117/DIG. 6 |
| 3,061,943 | 11/1962 | Bennett et al. | 117/DIG. 6 |
| 3,296,010 | 1/1967 | Craig et al. | 117/33 |
| 3,477,118 | 11/1969 | Terrill | 350/105 X |
| 3,517,428 | 6/1970 | Gadd | 29/196.2 |
| 3,577,268 | 5/1971 | Whitfield | 29/196.2 |
| 3,584,932 | 6/1971 | Terrill | 29/197.5 |

FOREIGN PATENTS OR APPLICATIONS

| | | | |
|---|---|---|---|
| 31,182 | 2/1961 | Finland | 117/33 |
| 211,584 | 11/1957 | Austria | 117/DIG. 6 |

*Primary Examiner*—William D. Martin
*Assistant Examiner*—Sadie L. Childs
*Attorney, Agent, or Firm*—John P. Taylor, Esq.

[57] ABSTRACT

Spherical glass beads of less than 30 mils in average diameter and preferably less than 5 mils in average diameter are embedded in metallic coatings such as aluminum, zinc, tin or lead to a depth of from 1/6 to 1/2 their average diameter by propelling said spheres by compressed air against the coating while it is in a molten condition.

1 Claim, No Drawings

ALUMINOUS METAL WITH GLASS BEADS BONDED TO A METAL SUBSTRATE

CROSS-REFERENCE TO RELATED APPLICATIONS

This application is a continuation-in-part to application Ser. No. 119,906, filed Mar. 1, 1971, now abandoned.

BACKGROUND OF THE INVENTION

1. Field of the Invention

This invention relates to formation of a reflective surface by partially embedding spherical glass beads in a metallic coating while it is in the molten condition.

2. Description of the Prior Art

Highway markers including signs, barriers, guard rails or the like desirably include some form of retro-reflection to make them visible from considerable distances by night-time drivers under the illumination of their headlights. One form of such reflection which has yielded good results involves application of glass beads to the surface, particularly, of generally flat or planar objects such as signs or highway markers. One way of making such objects has been to cover them with a form of plastic tape containing embedded particles of glass which are made visible when light from the headlights of automobiles strikes them.

To cover objects with such relfective tape either completely or in portions where retro-reflection is desired is a rather expensive task, however, and one which is considerably less practical and useful than one which would give desired reflecting characteristics to the product itself as manufactured. Attempts have been made to do the latter by using an organic or non-metallic bonding agent to adhere the glass beads to the substrate. It has also been proposed in Terrill U.S. Pat. No. 3,477,118 to braze large glass beads to the metal surface of a sign by using an aluminum brazing alloy cladding or coating on the surface of the sheet used to make the sign. The latter method is satisfactory when flat, horizontally positioned sheets are employed which offer a sufficient thickness of a lower melting point cladding. The thick cladding becomes a molten metal puddle upon controlled heating which remains in place on the horizontal surface of the sheet as long as horizontal positioning is maintained. In this manner, such large beads as proposed by Terrill may be firmly embedded in the molten metal by mechanical means. The clad brazing alloy also provides a thick enough molten puddle on a sheet to inhibit too rapid cooling, i.e., cooling before application of the bead which would interfere with the bond therebetween.

However, it has become desirable to establish a reflective surface on materials including non-planar objects which, by necessity, must have a thin molten metallic coating thereon, since a thicker layer is reduced by drainage prior to solidification. Such thin coatings may be formed, for example, by what is known in the trade as hot-dipping. This involves application of a lower melting point material such as aluminum, zinc, tin, or lead, to a higher melting point material such as, steel or iron, usually to enhance corrosion resistance of the substrate. Such dipped coatings are relatively thin and solidify relatively quickly after application due to the small amount of molten material on the surface. Large beads such as described by Terrill, cannot be successfully applied to such dipped coating surfaces probably due to the characteristic thinness of the coating which does not provide an adequate bond with the large beads. Quite surprisingly, however, it has been discovered that under controlled conditions, such coated surfaces can be reflectorized using glass beads, without resorting to adhesives or binders derived from organic compounds which are, for example, susceptible to deterioration when exposed outdoors to ultraviolet rays from the sun or wiped with certain solvents.

SUMMARY OF THE INVENTION

It is therefore an object of the invention to provide a reflectorized product comprising spherical glass beads partially embedded in a thin coating of aluminum, zinc, tin, lead, or alloys thereof formed on a higher melting point substrate by partially embedding the beads under controlled conditions into the coating while it is in a molten form.

It is another object of the invention to provide a novel method for forming a reflective coating on such a product.

In accordance with the invention, a reflective object is produced by first hot-dip coating the surface of a higher melting point substrate with a metal selected from the class consisting of aluminum, zinc, tin, lead, and alloys thereof to establish an overlay of 1–5 mil thickness and then bombarding the molten metal overlay with spherical glass beads of about 2 to 30 mils average diameter using compressed air at about 2 to 25 psi to embed the particle to a depth of from about 1/6 to about ½ the average diameter. In a particularly preferred embodiment of the invention, the reflective object is formed using a ferrous metal substrate dipped in molten aluminum, the latter having the highest reflectance for light of the coating metals described.

Description of the Preferred Embodiments

The formation of a reflective article in accordance with the invention by impingement of reflective glass particles in an air stream to a molten metal surface involves a number of factors including: selectivity of bead material, including careful control of bead size and refractive index; application parameters including air stream pressure; and condition of the coated substrate including temperature, thickness, and type of molten metal.

The glass particles must be shperical or generally spherical beads to provide the desired optical properties and should have an average diameter or particle size distribution of less than 30 mils and preferably about 1–5 mils. Some particles may be smaller, or of less diameter or greater cross section than others. Thus, the terms "particle size distribution" or "diameter of less than 30 mils" includes the average of this or like variation in greatest cross section of individual particles. Most efficient results are obtained when the average diameter or particle size distribution of the spherical particles is about 1–5 mils.

The constituents of the glass beads are not critical to adhesion, although they may influence optical characteristics such as refractive index and color or performance characteristics such as weatherability or softening range. In order to permit application of the particles to a molten metal surface without distorting the spherical shape, the softening range should be above the melting point of the coating metal. For example, glass beads should not soften at temperatures up to about 1350°F when aluminum is used.

The glass beads should have a refractive index of at least about 1.4; preferably should be about 1.8 to 2.0; and optimally about 1.9. Higher refractive indices up to about 2.2 are more expensive to achieve but are desirable if films such as transparent plastic or the like are applied over the beads which effectively lowers the refractive index. In one embodiment of the invention, a mixture of beads having a refractive index of about 1.9 and beads having a refractive index of about 2.1 are applied to a molten surface to provide a reflective article which, when coated with a film of water—such as when a reflective article on a highway is wetted by rain—will not have its reflectance substantially impaired by the additional layer of water on the beads which tends to lower the effective index of refraction of the beads.

In accordance with the invention, the glass beads are propelled against the molten metal surface by compressed air to provide a sufficient velocity component to the beads perpendicular to the surface to be reflectorized to enable them to penetrate the molten surface and to embed to a depth of about 1/6 to about ½ their average diameter. Air pressure should be controlled at about 2-25 psig and preferably at about 5-15 psig when the preferred spray distance of about 6 inches to 3 feet is used as will be discussed below.

The use of compressed air to drive the beads into the molten metal surface has been found to impart the requisite force needed to embed the beads without either deleteriously distorting the molten surface or cooling the surface too much before the beads are embedded. For example, pressing an article containing a molten surface into a quantity of beads contained on a solid surface has been found to cause wrinkling and other distortions of the molten metal surface, even though the beads are effectively bonded to the metal surface. Conversely, means such as a roller used to provide a more even pressure to avoid such distortions can result in an undesirable high rate of cooling apparently due to the heat loss to the physical means providing the contact. Both of these methods, furthermore, are limited to flat surfaces or very simple contours.

The range of air pressure used to impart velocity to the beads has been found to be important because for a given spray distance, insufficient pressure does not sufficiently embed the beads into the molten metal while pressures above the specified range impart too much energy to the bead, causing it to bounce off the solid substrate or embed too deeply in the molten coating, which, in either case, gives unsatisfactory reflectance characteristics to the final product.

In this regard, it should be noted that the desired velocity of the bead is related to the particle size. Larger particles, having larger masses, acquire a proportionately higher momentum when the same velocity is imparted to them and thus such particles as, for example, those used in the aforesaid Terrill patent, will bounce off the solid substrate rather than embed in the molten coating. While lowering of the air pressure lowers the acquired momentum of such particles, the initial inertia to be overcome by the larger particle as well as the greater frictional drag makes control of application pressures by air pressure impractical if not impossible.

Large beads, i.e., above 30 mils, also do not acquire adequate adhesion to coatings in the 1-5 mil range. This is considered a strong limitation because molten coatings of the metals described seldom exceed this thickness on vertical surfaces, which are commonly encountered in hot-dip coating operations. It should be noted that curved surfaces such as guard rails, bumpers, or the like are most easily coated using such hot-dip techniques and thus it would be unusual to have a thicker coating available.

Preferably, the beads are propelled against the molten surface using an air gun fitted with a reservoir for the beads to aspirate the beads into the compressed air stream. Such apparatus is, of course, well known to those skilled in the art. Other means such as centrifugal force can also be used provided the molten surface is not contacted with physical means other than the beads to either distort or cool the molten surface.

Preferably, the article to be reflectorized is placed at a distance of about from 6 inches to about 3 feet from the nozzle of the air gun, when the preferred compressed air pressure range of 2-25 psig is used. Obviously, the part could be placed a further distance away if a higher pressure was used which would then result in the bead impacting the metal with approximately the same force and, therefore, achieve the same degree of embedment. Such higher pressures, however, present problems in terms of control of the divergence of the particle stream which can result in uneven impact velocities and/or wastage of beads.

To provide sufficient adherence of the beads to the molten metal surface, the beads must be embedded to a depth of 1/6 to ½ the average diameter of the bead. In a preferred embodiment, a layer of molten metal of sufficient thickness may be obtained by dipping a product comprising steel or another higher melting point metal or alloy substrate into molten aluminum, zinc, tin, or lead or alloys thereof, just prior to embedding the glass particles therein.

In one embodiment of the invention, an article comprising a steel substrate is immersed in a molten bath of aluminum, zinc, tin, lead, or alloys thereof and then withdrawn from the bath at a rate sufficient to provide a substantially uniform thin coating thereof and then immediately sprayed with the fine glass beads previously described. A withdrawal rate of about 1-25 feet per minute has been found to provide such a coating thickness. Higher withdrawal rates could be used, however, if other means to control coating thickness are used. This procedure has been found to result in a relatively uniform molten metal overlay suitable both for embedding of the glass beads and for formation, as the molten layer cools, of a sufficiently thick layer for corrosive protection of the steel substrate.

Aluminum has been found to be a particularly preferred material for use as the molten metal when the preferred hot-dip coating technique is used due to its higher reflectivity with respect to zinc, tin, or lead. As stated previously, a requirement of our invention is that the glass beads contact the surface in which they are to be embedded while the metal surface such as aluminum is still molten with sufficient force to rupture and penetrate any oxide which may be present thereon. According to our process, after the beads are embedded in the molten metal surface, the surface is cooled to a temperature at which the molten metal solidifies, thereby retaining the beads rigidly positioned therein and adherent thereto. While we do not wish to be bound by any particular theory as to why the particles are held securely in place once applied, it appears that they are wet by molten metal sufficiently by being embedded to a minimum of about 1/6 their average diameter to become rigidly positioned when the metal solidifies during a subsequent cooling step. If embedded to more than ½ their diameter, reflectivity is decreased, probably because of the decreased surface area through which the light can be received or transmitted.

The following examples will serve to further illustrate the invention:

EXAMPLE I

Mild steel panels (3 inches × 10 inches × 3/16 inches) were hot-dipped in aluminum so that a coating 2 mils thick was formed thereon. The panels were then sprayed with glass beads before the coating solidified, by placing the panels within 2–3 feet of an air blast gun having a ⅜ inch diameter nozzle adapted for spraying solid glass beads, the air blast apparatus containing glass beads of several different sizes. Blast pressures of 2–25 psi were employed. The panels were then cooled to solidify the coating and thereby hold the glass beads embedded in the aluminum coating surface. The following table gives the relative density (coverage in amount of beads per given surface area expressed as from minimal or non-uniform to high) and adhesion (expressed as from poor to good) of the glass bead deposit as a function of the air pressure and bead size. Relative density was visually observed. Adhesion was determined by the thumbnail scraping test.

Similar results were obtained when zinc was substituted for aluminum at a coating thickness of about 2 mils.

mote adherence of the larger beads. The molten metal coating was sprayed with large solid glass beads (0.132–0.157 inch) at air pressures of 1, 2, and 3 psig under essentially the same conditions as that specified in Example I. Adherence of the beads was practically nil. It was observed that the beads delivered at these pressures rebounded from the molten metal surface. (In fact, no adherence was observed.) Some fragmentation was also observed apparently due to thermal or mechanical shock. Below 1 psig pressure, the beads would not aspirate. At 1 psig, aspiration of the beads was achieved, however, their total horizontal travel was only about 5 feet.

EXAMPLE III

Steel panels similar to those in Example I were hot-dipped respectively in either aluminum or zinc. Some of each of the panels were then sprayed with 0.0029–0.0041 inch diameter beads at 5 psig to provide two panels each of sprayed and unsprayed aluminum coated panels and two panels each of sprayed and unsprayed zinc coated panels.

One of each of the types of panels was then subjected to a 5% neutral salt spray at 95°F for 3 months while the remaining panels were exposed to 100% relative humidity at 125°F for 3 months. The results are tabulated below. It should be noted that the coating thicknesses reported are the final thicknesses. In each case, the presence of the beads resulted in an increase in the

TABLE I

| Bead Diameter (Inches) Air Pressure (psi) | SAMPLE I | | SAMPLE II | | SAMPLE III | | SAMPLE IV | |
|---|---|---|---|---|---|---|---|---|
| | 0.0232 – 0.0331 | | 0.0070 – 0.0098 | | 0.0029 – 0.0041 | | 0.0017 – 0.0024 | |
| | Relative Density | Adhesion Rating | Relative Density | Adhesion Rating | Relative Density | Adhesion Rating | Relative Density | Adhesion Rating |
| 2.0 | Few | Low | Moderate Minus | Fair | High | Fair Minus | Non-uniform | Poor |
| 2.5 | — | — | Moderate Minus | Good | — | — | — | — |
| 7.5 | Minimal | Very Low | Low | Good | High | Good Minus | High | Good Minus |
| 10 | — | — | — | — | — | — | High | Good |
| 25 | — | — | — | — | Moderate Plus | Good | Moderate Plus | Good |

EXAMPLE II

Steel panels similar to those of Example I were hot-dipped in aluminum to form a molten metal layer thereon. For these panels, however, withdrawal was made at a faster rate, i.e., about 25 feet or more per minute to form a thicker coating of about 3 mils to procoating thickness (without any additional coating metal used) probably due to the displacement of the molten metal during the spray application. This increase in coating metal thickness is believed to contribute to the enhanced corrosion resistance of the panels having beads sprayed thereon.

TABLE III

| Sample | Coating Thickness (Average) | Comments |
|---|---|---|
| Continuous 5% Neutral Salt Spray at 95°F 3 Months | | |
| Al | 1.6 | No appreciable adhering products; surface non-uniformly stained a grey color; few small scattered sites of rust and/or rust staining |
| Al + beads | 2.8 | No appreciable adhering products; surface non-uniformly stained a light grey color; very few small scattered sites of rust and/or rust staining; beads readily visible |
| Zn | 1.8 | Severe buildup of white corrosion product over entire surface; scattered rust and/or rust staining covered about one half of surface |
| Zn + beads | 3.5 | Severe buildup of white corrosion product over entire surface; scattered rust and/or rust staining covered about one fifth of surface; no beads visible, being obscured by adhering products |
| Condensing 100% Relative Humidity at 125°F 3 Months (2) | | |
| Al | 1.4 | No appreciable adhering products; no significant rust and/or rust staining |
| Al + beads | 2.7 | No appreciable adhering products; no rust or rust staining except for 1 small site on edge; beads readily visible |

TABLE III-continued

Continuous 5% Neutral Salt Spray at 95°F 3 Months

| Sample | Coating Thickness (Average) | Comments |
|---|---|---|
| Zn | 2.9 | Mild-moderate buildup of white corrosion product; no rust or rust staining except for 2 small areas on edge |
| Zn + beads | 3.5 | Mild buildup of white corrosion products; no rust or rust staining except for 1 small area in 1 corner; no beads visible, being obscured by adhering products |

EXAMPLE IV

Steel panels similar to those in Example I were hot-dipped in aluminum to form a 2 mil thick coating thereon. While the metal was still molten, one of the plates was placed by hand into a bed of beads approximately 0.0029 inch diameter. After cooling, the plate was inspected. A number of the beads were found to have adhered to the surface. However, the surface was also found to be not smooth and rather non-uniform in thickness which impaired the appearance and retro-reflection characteristics of the panel.

A cylinder was coated as above with the same 2 mil thick layer and then beads as above were applied by rolling the cylinder (while the coating was still molten) in a bed of glass beads. In this instance, adherence was also found to be good, but the same surface disturbances and non-uniformity of the molten metal layer were found to have occurred, impairing the appearance and retro-reflection characteristics of the coated article.

EXAMPLE V

Several panels similar to those of Example I were hot-dipped in aluminum and sprayed with glass beads following the procedure of Example I except that beads respectively of refractive indexes of 2.1, 2.2, 1.9, and a 1:1 mixture of 2.1 and 1.9 beads were applied. The bead sizes are shown in the accompanying table.

After each of the coated samples had solidified, retro-reflection of each panel was checked with a light under dry conditions and then the panel was wetted with water and again observed. As will be seen from the table, the 1:1 mixture of beads having a refractive index respectively of 2.1 and 1.9 provided the best overall retro-reflection qualities considering both wet and dry conditions.

TABLE V

| Refractive Index | Condition | Appearance |
|---|---|---|
| 2.1 (1) | dry | brighter than 2.2 bead; but not as bright as 1.9 bead |
|  | wet | brighter than 2.2 bead or 1.9 bead; bluish color in wet condition |
| 2.2 (2) | dry | not as bright as either 1.9 or 2.1 bead and exhibited yellowish tint |
|  | wet | bluish tint; brighter than 1.9 bead |
| 1.9 (3) | dry | brighter than 2.1, 2.2 or mixture of beads |
|  | wet | dullest of all |
| 2.1/1.9 mixture (1:1) | dry | brighter than either of 2.1 or 2.2 above but a little duller than 1.9 bead alone |
|  | wet | better than any of above samples when wet |

Note:  (1) 2.1 beads - less than .0029 inch thick
(2) 2.2 beads - over .0029 inch thick (this larger bead size as well as yellow coloring may account for bright not as good as 2.1 bead)
(3) 1.9 beads - range of .0049 to .0029 inch thick While the invention has been described in terms of preferred embodiments, the claims appended hereto are intended to encompass all embodiments which fall within the spirit of the invention.

Having thus described our invention and certain embodiments thereof, we claim:

1. A reflective metal object having enhanced corrosion resistance and both wet and dry retro-reflection characteristics and comprising an iron or iron base alloy substrate having a 1–5 mil thickness layer of aluminum thereon formed by dipping the substrate in a molten aluminum bath and having glass beads of 1–5 mil average diameter embedded by air pressure into said aluminum layer to a depth of about 1/6 to ½ the average diameter of the beads, said beads comprising a mixture of beads having respective refractive indices of about 1.9 and about 2.1 to thereby impart reflectivity to the surface regardless of the presence or absence of a film of water thereon.

* * * * *